United States Patent
Yasuhara

(10) Patent No.: US 12,078,892 B2
(45) Date of Patent: Sep. 3, 2024

(54) LIGHT CONTROL SHEET COMPRISING A LIQUID CRYSTAL LAYER HAVING A LIQUID CRYSTAL COMPOSITION WITH A PLURALITY OF SPACERS HAVING A PLURALITY OF DISCRETE PEAKS IN A SIZE DISTRIBUTION AND LIGHT CONTROL DEVICE

(71) Applicant: TOPPAN Inc., Tokyo (JP)

(72) Inventor: Toshiji Yasuhara, Taito-ku (JP)

(73) Assignee: TOPPAN Inc., Tokyo (JP)

( * ) Notice: Subject to any disclaimer, the term of this patent is extended or adjusted under 35 U.S.C. 154(b) by 0 days.

(21) Appl. No.: 17/560,521

(22) Filed: Dec. 23, 2021

(65) Prior Publication Data
US 2022/0121054 A1    Apr. 21, 2022

Related U.S. Application Data

(63) Continuation of application No. PCT/JP2020/024089, filed on Jun. 19, 2020.

(30) Foreign Application Priority Data

Jun. 28, 2019   (JP) .................................. 2019-121809

(51) Int. Cl.
*G02F 1/1339*     (2006.01)
*G02F 1/1334*     (2006.01)
(Continued)

(52) U.S. Cl.
CPC ...... *G02F 1/13396* (2021.01); *G02F 1/13392* (2013.01); *G02F 1/13439* (2013.01); *G02F 1/13306* (2013.01); *G02F 1/13345* (2021.01)

(58) Field of Classification Search
CPC ............. G02F 1/13345; G02F 1/13392; G02F 1/13396
See application file for complete search history.

(56) References Cited

U.S. PATENT DOCUMENTS 5,670,257 A  *  9/1997  Sakai ...................... C08F 30/08
                                                      428/404
6,307,612 B1    10/2001  Smith et al.
(Continued)

FOREIGN PATENT DOCUMENTS

JP         64-002226 U        1/1989
JP         01-113729 A        5/1989
(Continued)

OTHER PUBLICATIONS

Extended European Search Report issued on Jun. 24, 2022 in European Patent Application No. 20830862.7, 8 pages.
(Continued)

*Primary Examiner* — Paul C Lee
(74) *Attorney, Agent, or Firm* — Oblon, McClelland, Maier & Neustadt, L.L.P.

(57) ABSTRACT

A light control sheet including a first transparent electrode, a second transparent electrode, a liquid crystal layer formed between the first transparent electrode and the second transparent electrode, and spacers included in the liquid crystal layer. The spacers have an average size of 3 μm-50 μm, and the spacers have a size distribution that has a plurality of discrete peaks.

20 Claims, 4 Drawing Sheets

(51) Int. Cl.
*G02F 1/1343* (2006.01)
*G02F 1/133* (2006.01)

(56) References Cited

U.S. PATENT DOCUMENTS

| | | | |
|---|---|---|---|
| 2001/0051398 A1* | 12/2001 | Hirakata | H01L 27/1214 |
| | | | 438/149 |
| 2007/0236645 A1 | 10/2007 | Hashimoto | |
| 2010/0149463 A1* | 6/2010 | Shimizu | G02F 1/13394 |
| | | | 349/155 |
| 2014/0078423 A1 | 3/2014 | Suzuki et al. | |
| 2016/0282655 A1* | 9/2016 | Yu | G02F 1/13394 |

FOREIGN PATENT DOCUMENTS

| | | |
|---|---|---|
| JP | 08-110524 A | 4/1996 |
| JP | 2000-81627 A | 3/2000 |
| JP | 2000-171810 A | 6/2000 |
| JP | 2007-279322 A | 10/2007 |
| JP | 2017-200856 A | 11/2017 |
| JP | 2017198744 A * | 11/2017 |
| JP | 2018-031870 A | 3/2018 |
| JP | 2018-066935 A | 4/2018 |
| JP | 2018-112702 A | 7/2018 |
| JP | 6493598 B1 | 4/2019 |
| WO | WO 2018/016378 A1 | 1/2018 |

OTHER PUBLICATIONS

International Search Report issued Jul. 28, 2020 in PCT/JP2020/024089, filed Jun. 19, 2020, 6 pages (with English Translation).
Combined Chinese Office Action and Search Report issued Apr. 13, 2023 in Patent Application No. 202080043140.0 (with English translation and English translation of Category of Cited Documents), 10 pages.

* cited by examiner

LIGHT CONTROL SHEET COMPRISING A LIQUID CRYSTAL LAYER HAVING A LIQUID CRYSTAL COMPOSITION WITH A PLURALITY OF SPACERS HAVING A PLURALITY OF DISCRETE PEAKS IN A SIZE DISTRIBUTION AND LIGHT CONTROL DEVICE

CROSS-REFERENCE TO RELATED APPLICATIONS

The present application is a continuation of International Application No. PCT/JP2020/024089, filed Jun. 19, 2020, which is based upon and claims the benefits of priority to Japanese Application No. 2019-121809, filed Jun. 28, 2019. The entire contents of all of the above applications are incorporated herein by reference.

BACKGROUND OF THE INVENTION

Field of the Invention

The present invention relates to a light control sheet and a light control device.

Discussion of the Background

A light control sheet holds a liquid crystal composition in a polymer layer such as a polymer network. The thickness of the polymer layer is maintained at a predetermined thickness by spacers. The liquid crystal composition switches the light control sheet between transparent and opaque in response to change in voltage applied to the polymer layer (for example, see PTL 1). The types of the light control sheet are divided into a normal type and a reverse type. The normal type light control sheet is opaque when de-energized, and transparent when energized. The reverse type light control sheet is transparent when de-energized, and opaque when energized (for example, see PTL 2 and 3).

The degree of transparency during a transparent mode is evaluated according to the haze (JIS K 7136:2000). For example, it is evaluated that the lower the haze, the higher the degree of transparency in the transparent mode (for example, see PTL 4). The degree of opacity during an opaque mode is evaluated according to the transmitted image sharpness (JIS K 7374:2007) or clarity. For example, it is evaluated that the lower the transmitted image sharpness or the lower the clarity, the higher the degree of opacity in the opaque mode (for example, see PTL 5).

PTL 1: JP 2018-066935 A
PTL 2: JP 2017-200856 A
PTL 3: JP 2018-112702 A
PTL 4: JP 2018-031870 A
PTL 5: JP 6493598 B

SUMMARY OF THE INVENTION

According to an aspect of the present invention, a light control sheet includes a first transparent electrode, a second transparent electrode, a liquid crystal layer formed between the first transparent electrode and the second transparent electrode, and spacers included in the liquid crystal layer. The spacers have an average size of 3 µm-50 µm, and the spacers have a size distribution that has a plurality of discrete peaks.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
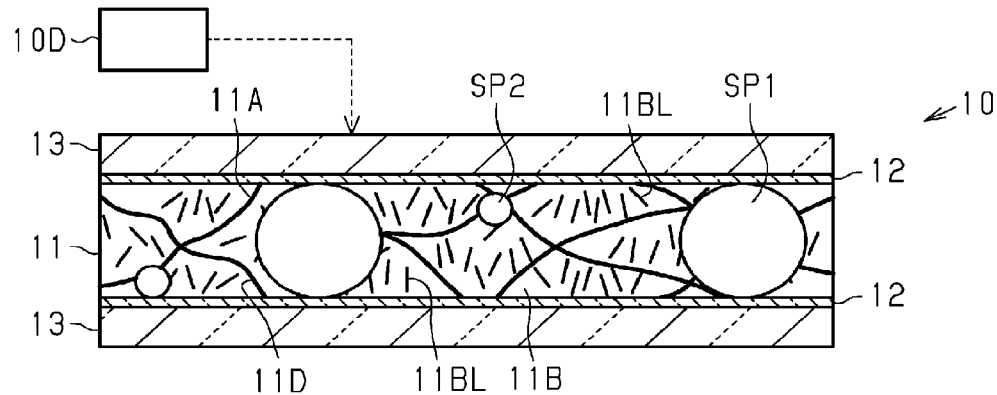
FIG. 1 is a cross-sectional view illustrating a normal type light control sheet when no voltage is applied.

The embodiments will now be described with reference to the accompanying drawings, wherein like reference numerals designate corresponding or identical elements throughout the various drawings.

With reference to FIGS. 1 to 9, an embodiment of a light control sheet and a light control device will be described. In the present embodiment, an object located on a side of the light control sheet opposite to that where an observation point is located is referred to as an observation target. The observation target may include, for example, a moving object such as a person and a stationary object such as a device or an ornament.

<Light Control Sheet>

The light control sheet may be mounted to, for example, a window of a moving object such as a vehicle or aircraft. Further, the light control sheet may be mounted to, for example, a window of various buildings in houses, stations, airports, or the like, partitions in offices, or a display window provided in stores. The light control sheet may also be used for a screen or the like for projecting an image.

The shape of the light control sheet may be flat or curved. The shape of the light control sheet may be a shape conforming to the shape of an object to which the light control sheet is mounted, or may be a shape different from an object to which the light control sheet is mounted. The type of the light control sheet may be a normal type, or may be a reverse type.

Figure 2:
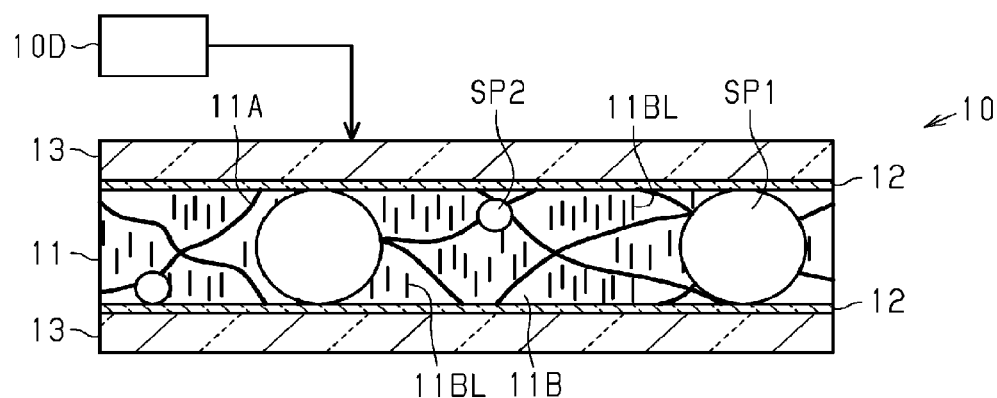
FIG. 2 is a cross-sectional view illustrating a normal type light control sheet when a voltage is applied.

With reference to FIGS. 1 and 2, a normal type light control sheet, and a light control device having a normal type light control sheet will be described. FIG. 1 illustrates a cross-sectional structure of a light control sheet when the normal type light control sheet is in an opaque state, and FIG. 2 illustrates a cross-sectional structure of a light control sheet when the normal type light control sheet is in a transparent state.

As shown in FIG. 1, a normal type light control sheet 10 includes a liquid crystal layer 11 and a pair of transparent electrodes 12. The liquid crystal layer 11 includes a transparent polymer layer having a plurality of domains and a liquid crystal composition filling the respective domains. The transparent polymer layer holds a liquid crystal composition.

The way the liquid crystal composition is held is selected from the group consisting of a polymer network type, a polymer dispersion type, and a capsule type. The polymer network type has a polymer network having a three-dimensional mesh form. The polymer network holds a liquid crystal composition in the voids communicating with each other in the mesh. The polymer dispersion type includes a polymer layer defining a large number of isolated voids, and holds a liquid crystal composition in the voids dispersed in the polymer layer. The capsule type holds an encapsulated liquid crystal composition in the polymer layer.

A domain is a void formed by the polymer network, an isolated void dispersed in the polymer layer, or a capsule dispersed in the polymer layer. The domain may be a void surrounded by transparent polymers, or may be a void connected to an adjacent domain. The light control sheet shown in FIGS. 1 to 4 is an example in which the way the liquid crystal composition is held is a polymer network type.

As shown in FIG. 1, the liquid crystal layer 11 includes a polymer network 11A as an example of a transparent polymer layer, and a liquid crystal composition 11B.

The polymer network 11A is a polymer of an ultraviolet polymerizable compound. The polymer network 11A defines a plurality of domains 11D. The domain 11D is a void connected to an adjacent domain 11D. The liquid crystal layer 11 is formed by, for example, applying UV radiation to a coating film. The coating film is a mixture of an ultraviolet polymerizable compound for forming the polymer network 11A and the liquid crystal composition 11B.

The liquid crystal composition 11B includes a plurality of liquid crystal molecules 11BL. The liquid crystal composition 11B is filled in the domain 11D. The liquid crystal molecules 11BL are selected from the group consisting of, for example, those based on a Schiff base, azo, azoxy, biphenyl, terphenyl, benzoic acid ester, tolan, pyrimidine, cyclohexanecarboxylic acid ester, phenylcyclohexane, and dioxane. The main component of the liquid crystal composition 11B is the liquid crystal molecules 11BL.

The weight concentration of the main component of the liquid crystal composition 11B is 80% or more of the liquid crystal composition 11B. In addition to the main component, the liquid crystal composition 11B may also contain dichronic dye, weather-resistance agent, and unavoidable components that are mixed in during formation of the liquid crystal layer 11. The weather-resistance agent is an ultraviolet absorber or a photostabilizer for suppressing deterioration of the liquid crystal composition 11B. The unavoidable components may be, for example, unreacted components of the ultraviolet polymerizable compound used for formation of the polymer network 11A.

A plurality of large spacers SP1 are dispersed in the liquid crystal layer 11. In the thickness direction of the liquid crystal layer 11, the length of the large spacer SP1 is substantially equal to the thickness of the liquid crystal layer 11. The plurality of large spacers SP1 prevent occurrence of variation in thickness of the liquid crystal layer 11. A plurality of small spacers SP2 are dispersed in the liquid crystal layer 11. In the thickness direction of the liquid crystal layer 11, the length of the small spacer SP2 is smaller than the length of the large spacer SP1. The thickness of the liquid crystal layer 11 is a dimension of the liquid crystal layer 11 in a direction perpendicular to a plane in which the liquid crystal layer 11 extends.

The spacers SP1 and SP2 are, for example, granular spacers. The granular spacers may include spherical spacers and non-spherical spacers. The non-spherical spacers may include cuboid spacers, cross-shaped spacers, and rod-shaped spacers.

Examples of the material constituting the granular spacers include an inorganic compound, an organic compound, and a composite material of organic compound and inorganic compound. The inorganic compound may be, for example, silicon dioxide or metal oxide such as an aluminum oxide or a titanium oxide. The organic compound may be, for example, at least one selected from the group consisting of a divinylbenzene resin, a styrene-based resin, a benzoguanamine resin, an acrylic resin, and an epoxy resin. Since the inorganic compound spacer has higher compressibility than an organic compound spacer, it is suitable for the large spacer SP1 that requires high compressibility.

The granular spacer may have fixation properties to other layer in contact with the liquid crystal layer 11. For example, the granular spacer may be subjected to a surface treatment to adhere to the transparent electrode 12 or a resin layer in contact with the liquid crystal layer 11.

The large spacers SP1 and the small spacers SP2 as granular spacers may be sprayed at the same timing or different timings. That is, the large spacers SP1 and the small spacers SP2 can be simultaneously sprayed, or the small spacers SP2 may be sprayed before or after the large spacers SP1 are sprayed. The granular spacers can be sprayed by a wet spraying method or a dry spraying method.

The spacers SP1 and SP2 may be, for example, protruding spacers. The protruding spacers may include photospacers formed by a photolithography method. The protruding spacers may be formed by, for example, patterning a photosensitive resin layer disposed on the transparent electrode 12. Alternatively, the protruding spacers may be formed by, for example, patterning a photosensitive resin layer disposed between the liquid crystal layer 11 and the transparent electrode 12. The protruding spacers have protrusions protruding from the transparent electrode 12 toward the liquid crystal layer 11. Further, the protruding spacers may have a shape protruding from the transparent electrode 12 toward the liquid crystal layer 11 in a cross-section parallel to the thickness direction of the liquid crystal layer 11, and the protrusions may be continuous to each other in a direction parallel to a plane in which the transparent electrode 12 extends. The transparent electrode 12, or the photosensitive resin layer disposed between the liquid crystal layer 11 and the transparent electrode 12 is an example of the contact layer.

The material for forming the spacers SP1 and SP2 may be the same or different from each other. That is, all of a plurality of spacers SP1 and SP2 may be made of the same material. Alternatively, a plurality of spacers SP1 and SP2 may include spacers SP1 and SP2 formed of a first material and spacers SP1 and SP2 formed of a second material. The alignment of the liquid crystal molecules 11BL is disturbed to some extent due to the presence of the spacers SP1 and SP2. Therefore, the material of the large spacers SP1 and the material of the small spacers SP2 are preferably a common material capable of preventing disturbance in alignment of the liquid crystal molecules 11BL.

The color of the spacers SP1 and SP2 may be the same as the color of the light control sheet required for the opaque mode, or may be different from the color of the light control sheet required for the opaque mode. From the viewpoint of increasing the saturation of the color of the light control sheet required for the opaque mode, the color of the spacers SP1 and SP2 is preferably the same as the color of the light control sheet required for the opaque mode. For example, when the color of the light control sheet required for the opaque mode is black, the spacers SP1 and SP2 preferably contain black pigment such as carbon black to exhibit black.

Two transparent electrodes 12 sandwich the liquid crystal layer 11 in the thickness direction of the liquid crystal layer 11. Each transparent electrode 12 transmits light in the visible range. The material of the transparent electrodes 12 may be selected from the group consisting of, for example, indium tin oxide, fluorine-doped tin oxide, tin oxide, zinc oxide, and carbon nanotubes, poly(3,4-ethylenedioxythiophene).

The light control sheet 10 includes a pair of transparent substrates 13. Two transparent substrates 13 sandwich the pair of transparent electrodes 12 in the thickness direction of the liquid crystal layer 11. Each transparent substrate 13 transmits light in the visible range. The material constituting the transparent substrate 13 may be, for example, transparent glass, transparent synthetic resin, or the like.

The liquid crystal layer 11 has a transparent state and an opaque state. The liquid crystal layer 11 alters the alignment of the liquid crystal molecules 11BL depending on the voltage application. The liquid crystal layer 11 switches between the transparent state and the opaque state depending on the change in alignment of the liquid crystal molecules 11BL. The transparent state of the liquid crystal layer 11 is a state in which the outline of an observation target can be visually recognized via the light control sheet 10. The opaque state of the liquid crystal layer 11 is a state in which the outline of an observation target cannot be visually recognized via the light control sheet 10.

FIG. 1 illustrates the light control sheet 10 in which a voltage for changing the alignment of the liquid crystal molecules 11BL is not applied. When a voltage for changing the alignment is not applied to the liquid crystal layer 11, the alignment direction of the liquid crystal molecules 11BL located in each domain 11D is random. Light incident on the light control sheet 10 via either of the two transparent substrates 13 is scattered into various directions in the liquid crystal layer 11. As a result, the normal type liquid crystal layer 11 has an opaque state, which is a turbid state, when no voltage is applied. The liquid crystal layer 11 in the opaque state may be in a white turbid state or a tinted turbid state. When the liquid crystal layer 11 in the opaque state has a tinted turbid state, the liquid crystal layer 11 includes a dye.

When the liquid crystal layer 11 is in the opaque state, the transmitted image sharpness of the light control sheet 10 is 75% or less, for example. The transmitted image sharpness is based on JIS K 7374:2007 with the optical comb width set to 0.125 mm. When the transmitted image sharpness of the light control sheet 10 is 75% or less, it is sufficient to make the outline of the observation target visually unrecognizable via the light control sheet 10.

When the liquid crystal layer 11 is in the opaque state, the clarity of the light control sheet 10 is 85% or less, for example. When the clarity of the light control sheet 10 is 85% or less, it is possible to achieve the effect which is substantially the same as that achieved when the transmitted image sharpness of the light control sheet 10 is 75% or less.

When the liquid crystal layer 11 is in the opaque state, the haze of the light control sheet according to JIS K 7136:2000 is preferably 90% or more. In this case, the outline of the observation target can be made visually unrecognizable, and further, the presence or absence of the observation target can be made visually unrecognizable.

As shown in FIG. 2, when a voltage for changing the alignment of the liquid crystal molecules 11BL is applied from a drive circuit 10D to the liquid crystal layer 11, the alignment of the plurality of liquid crystal molecules 11BL changes from a random alignment to an alignment that transmits light. For example, the alignment of the liquid crystal molecules 11BL changes such that the long axes of the liquid crystal molecules 11BL are oriented substantially perpendicular to a plane in which the liquid crystal layer 11 extends. In this case, light incident on the light control sheet 10 via either of the two transparent substrates 13 passes through the liquid crystal layer 11 without being substantially scattered in the liquid crystal layer 11. As a result, the normal type liquid crystal layer 11 enters a transparent state when a voltage is applied.

When the liquid crystal layer 11 is in the transparent state, the haze of the light control sheet according to JIS K 7136:2000 is preferably 10% or less. In this case, the observer can sufficiently visually recognize the observation target without feeling discomfort due to the presence of the light control sheet.

Figure 3:
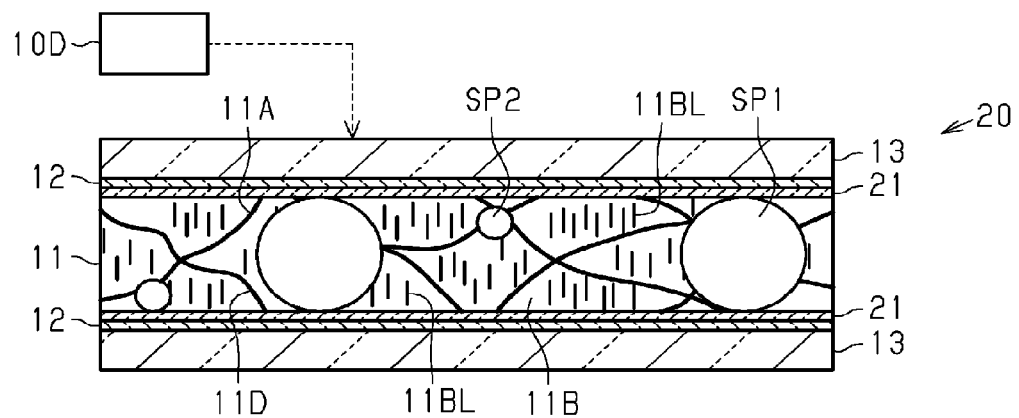
FIG. 3 is a cross-sectional view illustrating a reverse type light control sheet when no voltage is applied.
Figure 4:
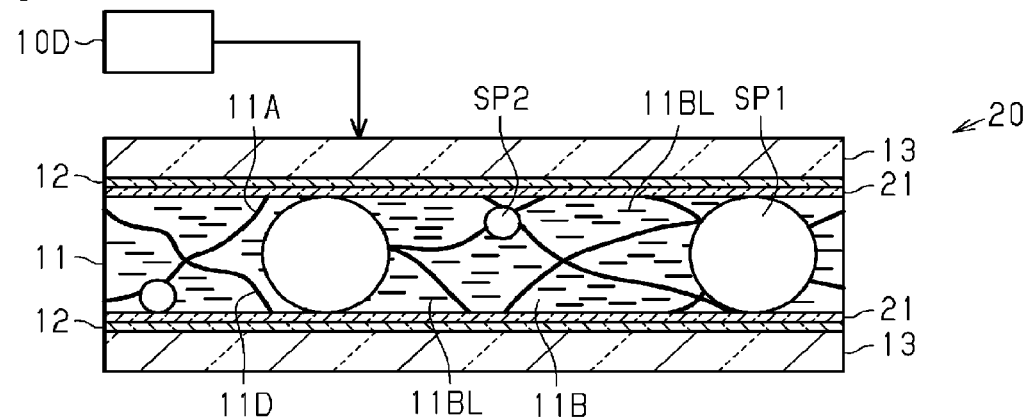
FIG. 4 is a cross-sectional view illustrating a reverse type light control sheet when a voltage is applied.

With reference to FIGS. 3 and 4, a reverse type light control sheet and a light control device having the same will be described. FIG. 3 illustrates a cross-sectional structure of the reverse type liquid crystal layer 11 in a transparent state, and FIG. 4 illustrates a cross-sectional structure of the reverse type liquid crystal layer 11 in an opaque state.

As shown in FIG. 3, a reverse type light control sheet 20 includes two alignment layers 21, in addition to the liquid crystal layer 11, two transparent electrodes 12, and two transparent substrates 13. The two alignment layers 21 sandwich the liquid crystal layer 11 in the thickness direction of the liquid crystal layer 11, and are positioned closer to the center portion in the thickness direction of the light control layer 11 than the two transparent electrode layers 12 are.

A first alignment layer 21 positioned between the liquid crystal layer 11 and a first transparent electrode 12 applies an alignment regulating force to the liquid crystal molecules 11BL. A second alignment layer 21 positioned between the liquid crystal layer 11 and a second transparent electrode 12 applies an alignment regulating force to the liquid crystal molecules 11BL. The material for forming the alignment layers 21 may be, for example, an organic compound such as polyimide, polyamide, polyvinyl alcohol, or cyanide compound, an inorganic compound such as silicon oxide or zirconium oxide, silicone, or a mixture thereof.

When the alignment layers 21 are vertical alignment layers, and a voltage for changing the alignment of the liquid crystal molecules 11BL is not applied to the liquid crystal layer 11, the alignment direction of the liquid crystal molecules 11BL in the domains 11D is a vertical alignment. In this case, light incident on the light control sheet 20 via either of the two transparent substrates 13 passes through the liquid crystal layer 11 without being substantially scattered in the liquid crystal layer 11. As a result, the reverse type liquid crystal layer 11 enters a transparent state when a voltage for changing the alignment of the liquid crystal molecules 11BL is not applied. The alignment layers 21 may be formed integrally with the spacers SP1 and SP2. In this case, the alignment layers 21 also have a function as the contact layer described above.

As shown in FIG. 4, when a voltage for changing the alignment of the liquid crystal molecules 11BL is applied from a drive circuit 10D to the liquid crystal layer 11, the alignment of the plurality of liquid crystal molecules 11BL changes, for example, from a vertical alignment to a horizontal alignment. In this case, the liquid crystal molecules 11BL are positioned in the domains 11D with the long axes of the liquid crystal molecules 11BL oriented parallel to a plane in which the liquid crystal layer 11 extends. Light incident on the light control sheet 20 via either of the two transparent substrates 13 is scattered by the liquid crystal layer 11. As a result, the reverse type liquid crystal layer 11 enters an opaque state when a voltage for changing the alignment of the liquid crystal molecules 11BL is applied.

In the reverse type light control sheet 20, the transmitted image sharpness and the clarity are the same as those in the normal type light control sheet 10. That is, when the liquid crystal layer 11 is in the opaque state, the transmitted image sharpness of the light control sheet 20, based on JIS K 7374:2007 with the optical comb width set to 0.125 mm, is 75% or less, for example. Further, when the liquid crystal layer 11 is in the opaque state, the clarity of the light control sheet 20 is 85% or less, for example. When the liquid crystal layer 11 is in the opaque state, the haze of the light control sheet 20 according to JIS K 7136:2000 is preferably 90% or more, for example.

<Transmitted Image Sharpness>

Next, with reference to FIGS. 5 and 6, a method of measuring the transmitted image sharpness in the opaque state will be described. As mentioned above, the transmitted image sharpness is a value measured by a method according to JIS K 7374:2000. The normal type light control sheet 10 is in the opaque state when no voltage is applied to the liquid crystal layer 11. Further, the reverse type light control sheet 20 is in the opaque state when a predetermined reference voltage is applied to the liquid crystal layer 11.

Figure 5:
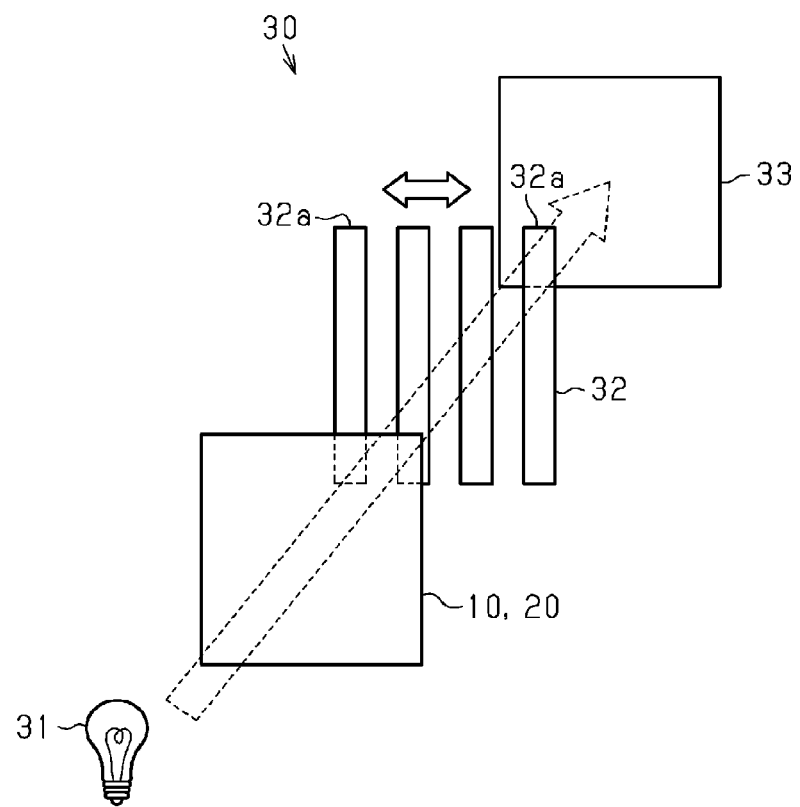
FIG. 5 is a device configuration diagram schematically illustrating a measurement device for measuring transmitted image sharpness.

As shown in FIG. 5, a measurement device 30 for measuring transmitted image sharpness includes a light source 31, an optical comb 32, and a light-receiving unit 33. In the measurement device 30, the light control sheets 10 and 20 to be measured are disposed between the light source 31 and the optical comb 32. In measurement of the transmitted image sharpness, the optical comb 32 moves parallel with a plane which is perpendicular to a direction in which the light source 31, the light control sheet, and the optical comb 32 are arranged, at a constant speed. The optical comb 32 includes shields 32a for shielding light, each having a width in the moving direction of the optical comb 32 which is defined to be an optical comb width. In the optical comb 32, the width of each shield 32a is equal to the width of each slit in the direction in which the optical comb 32 moves. In the present embodiment, the optical comb width is 0.125 mm.

Figure 6:
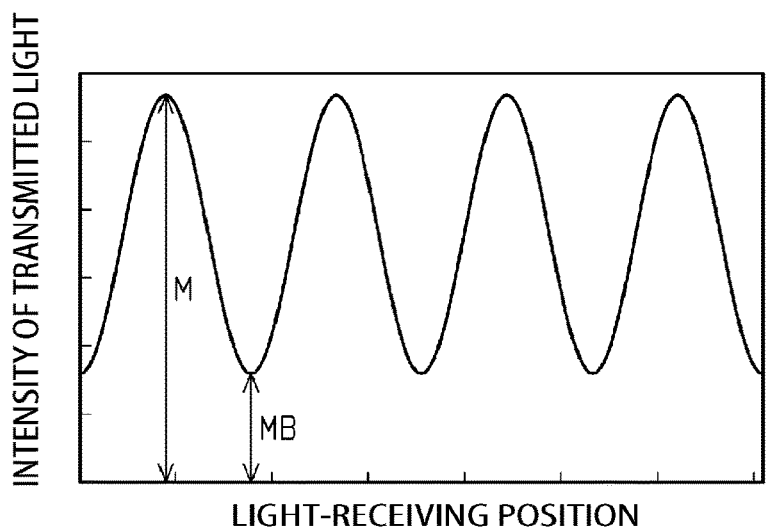
FIG. 6 is a graph showing the relationship between the intensity of transmitted light and a light-receiving position in a measurement device for measuring transmitted image sharpness.

As shown in FIG. 6, the intensity of light passing through the optical comb 32, i.e., the intensity of light received by the light-receiving unit 33, periodically changes. A maximum intensity of light received by the light-receiving unit 33 is defined as a maximum light intensity M, and a minimum intensity of light is defined as a minimum light intensity MB. The maximum light intensity M is obtained when the light that has passed through the light control sheets 10 and 20 is not shielded by the optical comb 32. The minimum light intensity MB is obtained when the light that has passed through the light control sheets 10 and 20 is shielded by the optical comb 32.

A transmitted image sharpness C(n) (%) when the optical comb width is n can be calculated from the following formula (1) by using the maximum light intensity M and the minimum light intensity MB:

$$C(n)=100\times(M-MB)/(M+MB) \quad \text{formula (1)}$$

<Clarity>

Figure 7:
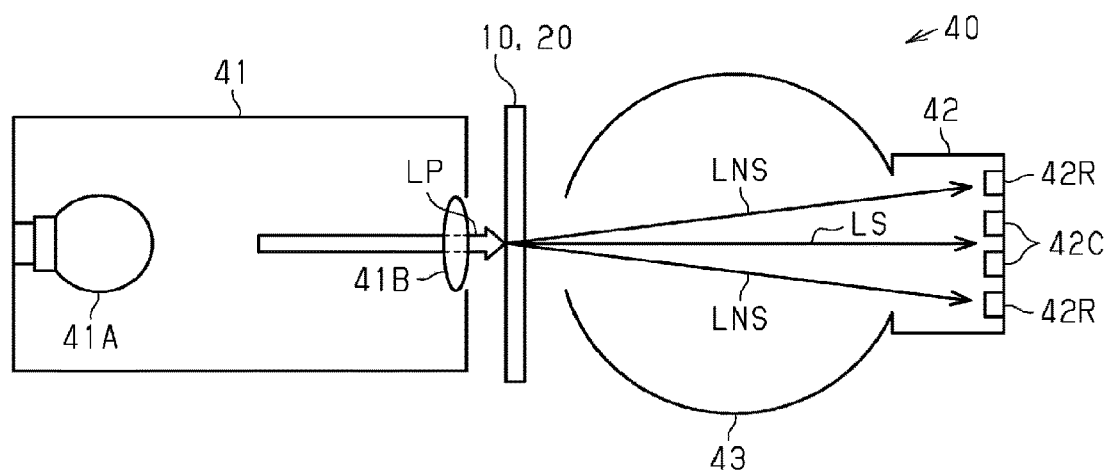
FIG. 7 is a device configuration diagram schematically illustrating a measurement device for measuring clarity.

Next, with reference to FIG. 7, a method of measuring the clarity in the opaque state will be described. FIG. 7 schematically shows an example of a measurement device used for measuring clarity. The normal type light control sheet 10 is in the opaque state when no voltage is applied to the liquid crystal layer 11. Further, the reverse type light control sheet 20 is in the opaque state when a predetermined reference voltage is applied to the liquid crystal layer 11.

As shown in FIG. 7, a measurement device 40 used for measuring clarity includes an illumination unit 41, a light-receiving unit 42, and an integrating sphere 43. The illumination unit 41 includes a light source 41A and a lens 41B. The light source 41A is a white LED, and the lens 41B converts light emitted from the light source 41A into parallel light. The light-receiving unit 42 includes a center sensor 42C and an outer peripheral sensor 42R. The center sensor 42C and the outer peripheral sensor 42R have an annular shape about a common axis. The outer peripheral sensor 42R is positioned outside the center sensor 42C. The measurement device 40 can be used for measuring not only clarity but also haze of an object to be measured. The integrating sphere 43 of the measurement device 40 is used only for measuring haze.

In the measurement device 40, the light control sheets 10 and 20 to be measured are disposed between the illumination unit 41 and the integrating sphere 43. The flux of parallel light LP emitted from the lens 41B has a diameter of 14 mm in the present embodiment. Light that has passed through the light control sheets 10 and 20 includes rectilinear light LS, which propagates along the optical axis of the parallel light LP that has entered the liquid crystal layer 11, and narrow-angle scattered light LNS, which is light other than the rectilinear light LS and propagates at an angle within ±2.5° relative to the optical axis of the parallel light LP. The range of angle formed by the rectilinear light LS relative to the optical axis of the parallel light LP is determined by the specification of the measurement device 40. The angle is set to be, for example, within the range in which the parallel light LP propagates when the light control sheets 10 and 20 are not present, and is substantially 0°.

In the light-receiving unit 42, the center sensor 42C receives the rectilinear light LS, and the outer peripheral sensor 42R receives the narrow-angle scattered light LNS. Among the light that has passed through the liquid crystal layer 11, the intensity of the rectilinear light LS received by the center sensor 42C is a center light intensity LC, and the intensity of the narrow-angle scattered light LNS received by the peripheral sensor 42R is a peripheral light intensity LR. The value of clarity is calculated from the following formula (2):

$$100\times(LC-LR)/(LC+LR) \quad \text{formula (2)}$$

As mentioned above, the haze of the light control sheet can be measured by using the measurement device 40. The haze is measured using a method according to JIS K 7136:2000. When the haze is measured using the measurement device 40, light that has passed through the light control sheet is received by the light-receiving unit disposed in the integrating sphere 43.

Haze is the percentage of transmitted light deflected from the incident light by 2.5° or more due to forward scattering to the entire transmitted light that has passed through the object to be measured. In haze measurements, light at an angle of less than ±2.5° relative to the optical axis of the parallel light LP described above is parallel light, and light at an angle of ±2.5° or more is wide-angle scattered light.

The transmittance of the wide-angle scattered light is defined as a scattered transmittance $T_d$, the transmittance of the parallel light is defined as a parallel transmittance $T_p$, and the sum of the parallel transmittance $T_p$ and the scattered transmittance $T_d$ is defined as a total light transmittance $T_t$. In this case, haze is the ratio of the scattered transmittance $T_d$ to the total light transmittance $T_t$.

As mentioned above, the clarity and the haze can be measured by using the measurement device 40. On the other hand, the clarity and the haze show properties different from each other in the light control sheets 10 and 20. The transmitted image sharpness and the haze also show properties different from each other in the light control sheets 10 and 20. The transmitted image sharpness and the clarity show the same properties and are parameters compatible with each other in the light control sheets 10 and 20.

The haze indicates the properties of the light control sheets 10 and 20 related to wide-angle scattered light. The haze indicates the degree of turbidity of the light control sheets 10 and 20 as a whole, for example, the degree of whiteness of the light control sheets 10 and 20 as a whole, perceived by the observer in visual inspection of the light control sheets 10 and 20. For example, the larger the haze of the light control sheets 10 and 20, the more blurred the observation target appears when perceived by the observer.

The clarity indicates the properties of the light control sheets 10 and 20 based on the narrow-angle scattered light. The clarity indicates the degree of clarity of a boundary between the observation target and a portion other than the observation target, or a minute part in the observation target. For example, the smaller the clarity of the light control sheets 10 and 20, the more blurred the outline of the observation target perceived via the light control sheets 10 and 20, in other words, the lower the sharpness of the observation target.

When the opacity of the light control sheets 10 and 20 is determined by the haze, the outline of the observation target may be or may not be clear even when the degree of turbidity of the light control sheets 10 and 20 is sufficient. Such a difference in the degree of blur of the outline is perceived by the observer as a difference in the degree of opacity when the light control sheets 10 and 20 are visually inspected by the observer. As a result, discrepancy may occur between the opacity based on the haze and the opacity perceived by visual inspection.

On the other hand, when the opacity of the light control sheets 10 and 20 is determined by the range of clarity, the degree of blur of the outline of the observation target increases as the clarity decreases. As a result, discrepancy may occur between the opacity based on the clarity and the opacity perceived by visual inspection. The value of clarity within the above range (≤85%) ensures obscuring of the outline of the observation target. Such light control sheets 10 and 20 are particularly useful for use in a case where a distance from the light control sheets 10 and 20 to the observation target is small, a case where the light source illuminating the observation target has a narrow illumination range, or a case where the intensity of light illuminating the observation target is large.

Further, when the opacity of the light control sheets 10 and 20 is evaluated using the transmitted image sharpness, it is possible to achieve an effect which is substantially the same as that achieved when the opacity is evaluated using the clarity. That is, according to the transmitted image sharpness, occurrence of discrepancy between the opacity based on the transmitted image sharpness and the opacity perceived by visual inspection can be minimized.

<Visual Evaluation>

For the light control sheet in the opaque state, the relationship of the haze, transmitted image sharpness, and clarity relative to the opacity perceived by visual inspection will be described. Since the normal type light control sheet 10 and the reverse type light control sheet 20 have a similar relationship between the parameters and the opacity perceived by visual inspection, only the evaluation using the normal type light control sheet 10 will be described below.

The opacity perceived by visual inspection is a result of evaluation performed by placing a fluorescent light with a light intensity of approximately 3,500 lm at a position 80 cm from the rear surface of the light control sheet which is in the opaque state and visually inspecting it from a position 20 cm from the front surface of the light control sheet. The observer's eye, the light control sheet and the fluorescent light were arranged in alignment. The light control sheets were rated 1st to 5th, in order from the level at which the fluorescent light is most difficult to perceive in the visual inspection.

The transmitted image sharpness was a value measured using an image clarity meter (ICM-1T, manufactured by Suga Test Instruments Co., Ltd.) by a method according to JIS K 7374:2007. The haze was a value measured using a haze meter (NDH7000SD, manufactured by Nippon Denshoku Industries Co., Ltd.) by a method according to JIS K 7136:2000. The clarity was a value measured using a haze/transparency meter (haze-gard i, manufactured by BYK-Gardner Gmbh).

Figure 8:
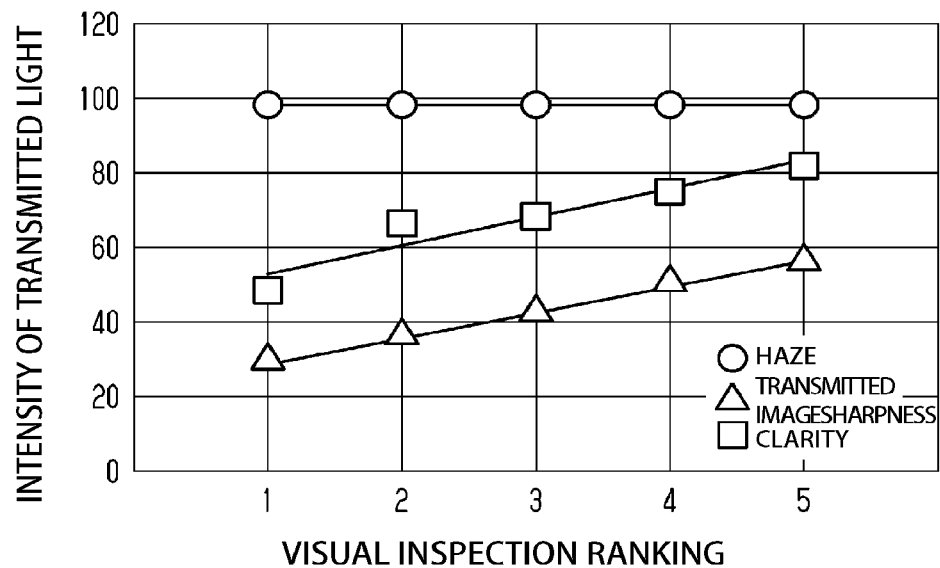
FIG. 8 is a graph showing the relationship of the haze, transmitted image sharpness, and clarity relative to the visual inspection ranking.

FIG. 8 shows the measurements of haze, transmitted image sharpness, and clarity in the visual inspection ranking. As shown in FIG. 8, the values of transmitted image sharpness were 30.4%, 36.5%, 42.6%, 51.5% and 56.2% in descending order of the visual inspection ranking of the light control sheets 10. The values of clarity were 49.0%, 64.6%, 66.8%, 75.8%, and 81.7% in descending order of the visual inspection ranking of the light control sheets 10. As seen from the above, the higher the visual inspection ranking, the lower the transmitted image sharpness and the clarity.

As described above, the clarity and the transmitted image sharpness match the opacity perceived by the eye in the range in which higher opacity is imparted. When the value of transmitted image sharpness is 75% or less, an opacity which makes the perception of the outline of the fluorescent light difficult is obtained. When the value of clarity is 85% or less, an opacity which makes the perception of the outline of the fluorescent light difficult is obtained.

The values of haze were 98.5%, 98.2%, 98.5%, 97.9%, and 98.1% in descending order of the visual inspection ranking of the light control sheets. As seen from the above, the haze is poorly correlated with the visual inspection ranking in the range in which higher opacity is imparted. The haze does not match the opacity perceived by the eye in the range in which higher opacity is imparted.

<Size Distribution of Spacers>

Figure 9:
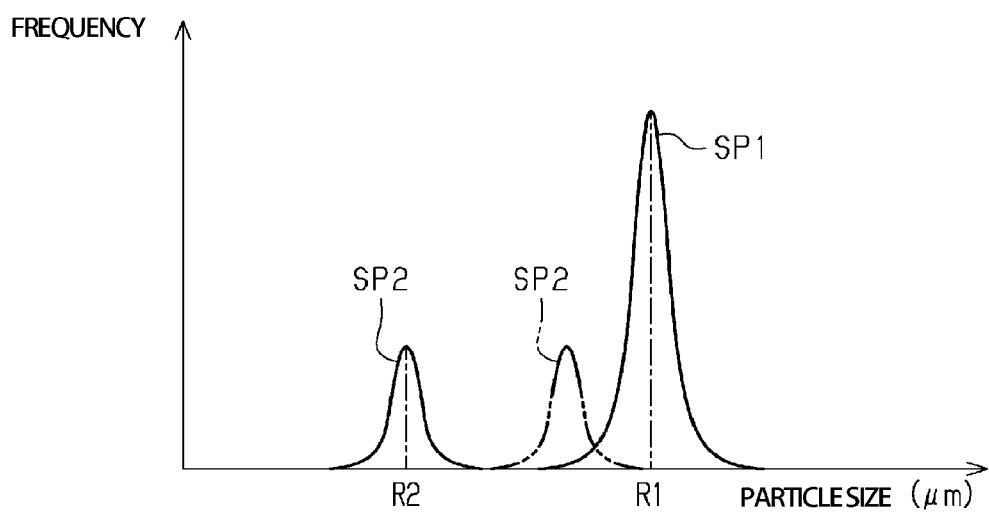
FIG. 9 is a graph showing an example of size distribution of spacers.

Next, with reference to FIG. 9, the size distribution of spacers included in the light control sheet will be described. FIG. 9 shows an example in which the spacers SP1 and SP2 are spherical spacers, the size of spacer is a particle size of the spacer, and the small spacers SP2 have one particle size, that is, the distribution has one peak derived from the small spacers SP2.

The size and size distribution of spacers included in the light control sheet satisfy the following conditions 1 and 2. The size distribution of spacers included in the light control sheet preferably satisfies the following conditions 3 to 7, in addition to the conditions 1 and 2.

(Condition 1) 3 μm≤average size≤50 μm
    (Condition 2) Having two discrete peaks
    (Condition 3) 8 μm≤mode R1≤50 μm
    (Condition 4) 3 μm≤mode R2≤7 μm
    (Condition 5) Second formulation ratio<First formulation ratio
    (Condition 6) 10%≤Second formulation ratio≤70%
    (Condition 7) 30/mm²≤Spacer density≤500/mm²

When the spacers SP1 and SP2 are spherical spacers, the size of the spacers SP1 and SP2 is a particle size, which is a diameter of the spacer. When the spacers SP1 and SP2 are non-spherical spacers, the size of the spacers SP1 and SP2 is a diameter of a sphere circumscribing the spacer. When the spacers SP1 and SP2 have a rod-shape, the size of the spacers SP1 and SP2 is a length of the spacer in the extending direction of the spacer. When the spacers SP1 and SP2 are protruding spacers, the size of the spacers SP1 and SP2 is a height of the spacer in the protruding direction of the spacer. When the large spacer SP1 is a post spacer that penetrates through the liquid crystal layer 11, the size of the large spacer SP1 is a thickness of the liquid crystal layer 11.

The average size of the spacers is a weighted average weighted by the number of spacers having the same size. The sizes of spacers used for calculation of average size are measured based on the spacers, for example, included in an image of the light control sheet of 1 mm² obtained by using an optical microscope. The average size of the spacers included in the light control sheet is a size capable of causing Mie scattering of light in the visible range, and is 3 μm or more and 50 μm or less, which satisfies the above condition 1.

The size uniformity of spacers is indicated by, for example, a CV value (coefficient of variation). The CV value is calculated as a ratio of the standard deviation of the particle size relative to the average particle size. The CV values of the large spacer SP1 and the small spacer SP2 are, for example, 3% or more and 5% or less.

As shown in FIG. 9, the size distribution of spacers included in the light control sheet has two discrete peaks, which satisfies the above condition 1. The two discrete peaks are a first peak and a second peak. The first peak is a peak to which the large spacers SP1 belong, that is, a peak derived from the large spacers SP1. The second peak is a peak to which the small spacers SP2 belong, that is, a peak derived from the small spacers SP2.

The peaks in the size distribution may be peaks that do not overlap each other as indicated by the peaks SP1 and SP2 of the solid line in FIG. 9, or may be bimodal peaks that partially overlap each other as indicated by the peak SP1 of the solid line and the peak SP2 of the two dots and dashed line in FIG. 9. The first peak and the second peak may be any peaks in which a mode R1 of the first peak and a mode R2 of the second peak are different from each other. The mode R1 of the first peak is a size that provides a maximum value of the first peak. The mode R2 of the second peak is a size that provides a maximum value of the second peak. When a part of the first peak and a part of the second peak overlap each other, the first peak and the second peak are separated by peak separation using a fitting technique by which each peak is approximated as a normal distribution.

The mode R1 of the size in the first peak is larger than the mode R2 of the size in the second peak. The mode R1 of the size in the first peak may be, for example, 8 μm or more and 50 μm or less, and preferably satisfies the above condition 3. That is, the first peak is a peak having a mode R1 for a largest size among the discrete peaks, and the mode R1 in the size distribution of the first peak is preferably 8 μm or more and 50 μm or less.

The mode R2 of the size in the second peak may be, for example, 3 μm or more and 7 μm or less, and preferably satisfies the above condition 4. That is, the second peak is a peak having a mode R2 for a second largest size among the discrete peaks, and the mode R2 in the size distribution of the second peak is preferably 3 μm or more and 7 μm or less.

When the mode R1 of the size in the first peak is 8 μm or more, the thickness of the liquid crystal layer 11 tends to be maintained at 8 μm or more. Accordingly, opacity in the opaque mode can be easily increased. When the mode R1 of the size in the first peak is 50 μm or less, the thickness of the liquid crystal layer 11 tends to be maintained at 50 μm or less. Accordingly, transparency in the transparent mode can be easily increased.

When the mode R2 of the size in the second peak is 3 μm or more, forward-scattered light due to the small spacers SP2 can be easily enhanced. Accordingly, transparency in the transparent mode can be easily increased. When the mode R2 of the size in the second peak is 7 μm or less, a difference can be made clear between the optical effect exhibited by the large spacers SP1 and the optical effect exhibited by the small spacers SP2.

The first formulation ratio is a ratio of the number of spacers belonging to the first peak to the number of all the spacers, and the formulation ratio of the large spacers SP1. The second formulation ratio is a ratio of the number of spacers belonging to the second peak to the number of all the spacers, and the formulation ratio of the small spacers SP2. The first formulation ratio is, for example, higher than the second formulation ratio, and preferably satisfies the above condition 5. That is, the number of spacers belonging to the first peak is preferably larger than the number of spacers belonging to the second peak. When the first formulation ratio is higher than the second formulation ratio, variation in thickness of the liquid crystal layer 11 can be easily prevented from occurring.

The second formulation ratio may be, for example, 10% or more and 70% or less, and preferably satisfies the above condition 6. In other words, when the size distribution of the spacers SP1 and SP2 is formed of the first peak and the second peak, the number of spacers belonging to the second peak is preferably 10% or more and 70% or less of all the spacers. Further, in other words, the first peak corresponds to 30% or more and 90% or less of the plurality of spacers, and the second peak corresponds to the remaining part of the plurality of spacers.

When the formulation ratio of the small spacers SP2 is 10% or more, improvement in the intensity of forward-scattered light due to the small spacers SP2 is achieved with high reliability. When the formulation ratio of the small spacers SP2 is 70% or less, uniformity in the thickness of the liquid crystal layer 11 due to the large spacers SP1 is further increased.

The spacer density is the number of spacers included per unit area in the liquid crystal layer 11. The unit area of the liquid crystal layer 11 is a unit area included in the liquid crystal layer 11 when viewed from the viewpoint facing a plane in which the liquid crystal layer 11 extends. The spacer density may be, for example, 30/mm² or more and 500/mm² or less, and preferably satisfies the above condition 7. When the spacer density is 30/mm² or more, variation in thickness of the liquid crystal layer 11 can be easily reduced. Further, when the spacer density is 500/mm² or less, the haze in the transparent mode can be prevented from being excessive.

Test Example 1

A polymer network type light control sheet of Test example 1 was obtained using spherical resin spacers as spacers SP1 and SP2. Spacers with the mode R1 of 20 μm were used as the large spacer SP1, and spacers having the mode R2 of 5 μm were used as the small spacer SP2. Further, the spacer density was 32/mm², and the first formulation ratio and the second formulation ratio were 70% and 30%, respectively.

Test Example 2

A polymer network type light control sheet of Test example 2 was obtained under the same conditions as those in Test example 1 except that the spacer density was changed to 265/mm².

Test Example 3

A polymer network type light control sheet of Test example 3 was obtained under the same conditions as those in Test example 1 except that the spacer density was changed to 497/mm².

Test Example 4

A polymer network type light control sheet of Test example 4 was obtained under the same conditions as those in Test example 1 except that the spacer density was changed to 612/mm².

Test Example 5

A polymer network type light control sheet of Test example 5 was obtained under the same conditions as those in Test example 1 except that the spacer density was changed to 25/mm².

Test Example 6

The spacer density was changed to 172/mm². The first formulation ratio and the second formulation ratio were changed to 25% and 75%, respectively, and the other conditions were made the same as those in Test example 1. Thus, a polymer network type light control sheet of Test example 6 was obtained.

Test Example 7

The spacer density was changed to 242/mm². The first formulation ratio and the second formulation ratio were changed to 95% and 5%, respectively, and the other conditions were made the same as those in Test example 1. Thus, a polymer network type light control sheet of Test example 7 was obtained.

For the light control sheets of Test examples 1 to 7, the haze was measured in both the transparent state and the opaque state using a haze meter (haze meter NDH-7000SP, manufactured by Nippon Denshoku Industries Co., Ltd.). Further, the clarity in the opaque state was measured according to the above-mentioned method for measuring clarity using a haze/transparency meter (haze-gard i, manufactured by BYK-Gardner Gmbh). The total thickness of the light control sheet was measured using a high accuracy digital micrometer (manufactured by Mitutoyo Corporation) at 10 measurement points positioned at an interval of 10 mm in a plane in which the light control sheet extends. After the liquid crystal layer 11 was wiped off with a solvent, the thickness of the substrate with the electrode attached thereto was again measured. The difference between these measurements was used as the thickness of the liquid crystal layer 11 to calculate the film thickness uniformity of the liquid crystal layer 11. The film thickness uniformity of the liquid crystal layer 11 can also be measured using an interference film thickness meter.

Table 1 shows the measurement results of the light control sheets of Test examples 1 to 7, that is, the haze in the transparent state, the haze in the opaque state, the clarity in the opaque state, and the film thickness uniformity. In Table 1, Test examples having the film thickness uniformity of 5% or less are evaluated as "good," and Test examples having the film thickness uniformity exceeding 5% are evaluated as "poor." The film thickness uniformity is a value obtained by dividing the difference between the maximum value and the minimum value by half of the sum of the maximum value and the minimum value.

TABLE 1

| Test Example | Spacer density (/mm²) | Ratio (%) SP1 | Ratio (%) SP2 | Haze (%) Transparent state | Haze (%) Opaque state | Clarity (%) Opaque state | Film thickness uniformity (%) |
|---|---|---|---|---|---|---|---|
| 1 | 32 | 70 | 30 | 4.5 | 93.0 | 84.0 | Good |
| 2 | 265 | 70 | 30 | 5.4 | 93.5 | 82.7 | Good |
| 3 | 497 | 70 | 30 | 8.1 | 93.5 | 73.0 | Good |
| 4 | 612 | 70 | 30 | 13.0 | 93.6 | 70.0 | Good |
| 5 | 25 | 70 | 30 | 4.3 | 93.0 | 98.0 | Poor |
| 6 | 172 | 25 | 75 | 5.8 | 93.7 | 71.0 | Poor |
| 7 | 242 | 95 | 5 | 4.8 | 92.7 | 89.0 | Good |

As seen from Table 1, in Test examples 1 to 4, it is found that as the spacer density increases, the clarity in the opaque state decreases within the range of 85% or less, increasing the opacity. On the other hand, it is found that as the spacer density increases, the haze in the transparent state increases to more than 10%, reducing the transparency. In all the test examples, the haze in the opaque state is 90% or more, and does not depend on the spacer density. Further, it is found that sufficient film thickness uniformity is obtained in each of Test examples 1 to 4.

In Test example 5, in which the spacer density is smaller than each of Test examples 1 to 4, it is found that the haze in the transparent state is as low as 4.3%, whereas the clarity in the opaque state is as high as 98%, reducing the opacity.

In Test example 6, the first formulation ratio is lower and the second formulation ratio is higher than in Test examples 1 and 2. Accordingly, in Test example 6, it is found that the haze in the transparent state and the clarity in the opaque state are good, whereas the film thickness uniformity is poor.

In Test example 7, the first formulation ratio is higher and the second formulation ratio is lower than in Test example 2. Accordingly, in Test example 7, it is found that the clarity in the opaque state is as high as 89%, reducing the opacity in the opaque state.

The large spacers SP1 enhance the intensity of forward-scattered light due to Mie scattering compared with the small spacers SP2. As seen from comparison between Test example 2 and Test example 7, increasing the second formulation ratio as the formulation ratio of the small sized spacers SP2 decreases the intensity of forward-scattered light and thus increases opacity in the opaque mode, while retaining transparency in the transparent mode within a sufficiently acceptable range.

Further, as seen from comparison between Test examples 1, 2 and Test example 6, increasing the first formulation ratio as the formulation ratio of the large sized spacers SP1 increases the intensity of forward-scattered light due to Mie scattering and thus increases transparency in the transparent mode, while retaining opacity in the opaque mode within a sufficiently acceptable range.

Moreover, as seen from comparison among Test examples 1 to 5, in which the first and second formulation ratios are the same, the tendency remains that as the spacer density increases, transparency in the transparent mode decreases and opacity in the opaque mode increases. Further, as seen from comparison among Test examples 1 to 6, it is found that variation in thickness of the liquid crystal layer 11 tends to occur when the density of the large spacers SP1 is too low.

According to the above embodiment, the following effects can be obtained.

(1) According to the light control sheets 10 and 20 satisfying the above conditions 1 and 2, transparency in the transparent mode and opacity in the opaque mode can be individually adjusted by increasing the formulation ratio of the large spacers SP1 or increasing the formulation ratio of the small spacers SP2. That is, the degree of design freedom can be expanded to mitigate the correlation between two opposite physical properties.

(2) According to the light control sheets 10 and 20 satisfying the above condition 3, the thickness of the liquid crystal layer 11 can be maintained within an appropriate range when the liquid crystal layer 11 enables both transparency and opacity.

(3) According to the light control sheets 10 and 20 satisfying the above condition 4, the size of spacers can be easily set within an appropriate range when a difference in forward-scattered light between the large spacers SP1 and the small spacers SP2 is used.

(4) According to the light control sheets 10 and 20 satisfying the above condition 5, the degree of design freedom can be expanded to mitigate the correlation between two opposite physical properties, and in addition, variation in thickness of the liquid crystal layer 11 can be suppressed.

(5) According to the light control sheets 10 and 20 satisfying the above condition 6, the haze in the transparent mode and the clarity and the transmitted image sharpness in the opaque mode can be set in respective preferable ranges.

(6) According to the light control sheets 10 and 20 satisfying the above condition 7, variation in thickness of the liquid crystal layer 11 can be suppressed, and the haze in the transparent mode can be prevented from being excessive.

(7) When the spacers SP1 and SP2 are at least either granular spacers or protruding spacers, it is easy to modify the designs of the formulation ratio and the size of spacers while obtaining the above effects.

The above embodiment can be modified and implemented as follows.

The size distribution of spacers may have three or more peaks. In this case, a peak having a largest mode of the size in the peak corresponds to the first peak, and two or more peaks other than the first peak correspond to the second peak.

The light control sheets 10 and 20 may further include a barrier layer that covers an end face of the liquid crystal layer 11, a surface of the transparent electrode 12, and the like. The barrier layer may have at least one of gas barrier function and UV barrier function.

The light control sheets 10 and 20 may further include a light transmissive substrate having a function of increasing the mechanical strength of the light control sheet. Examples of the material that constitutes the light transmissive substrate include transparent inorganic materials such as glass and silicon, and transparent organic materials such as polymethacrylic acid ester resin, polyethylene, polystyrene, polyethylene terephthalate, polyvinyl alcohol, polycarbonate, polyvinyl chloride, polyimide, and polysulfone.

In the normal type light control sheet 10, the opaque state of the liquid crystal layer 11 may be achieved by applying a voltage lower than a voltage in the transparent state.

The present application addresses the following. In recent years, the applications of light control sheets have expanded, and demands for improving the transparency of the light control sheet in the transparent mode and demands for improving the opacity in the opaque mode have been increasing, depending on the application. For example, for a light control sheet applied to a windshield of a vehicle, it is strongly required to decrease the haze in the transparent mode in order to enhance the visibility in the transparent mode. For the light control sheet applied to a window of a conference room or the like, it is strongly required to decrease the clarity in the opaque mode in order to protect privacy in the room.

On the other hand, the values of clarity and transmitted image sharpness in the opaque mode and the value of haze in the transparent mode have a trade-off relationship, in which one increases when the other decreases. For example, when the clarity in the opaque mode is decreased by increasing the spacer density, the haze in the transparent mode increases, which results in a decrease in the degree of transparency in the transparent mode. On the other hand, when the haze in the transparent mode is decreased by decreasing the spacer density, the clarity in the opaque mode increases, which results in a decrease in the degree of opacity in the opaque mode. As described above, for the light control sheet balancing transparency and opacity, it is required to expand the degree of design freedom to mitigate the correlation between two opposite physical properties.

The present invention has an aspect to provide a light control sheet capable of expanding the degree of design freedom and a light control device having the same.

A light control sheet includes: a first transparent electrode; a second transparent electrode; a liquid crystal layer disposed between the first transparent electrode and the second transparent electrode; and a plurality of spacers disposed in the liquid crystal layer, wherein the spacers have an average size of 3 μm or more and 50 μm or less, and the spacers have a size distribution having two or more discrete peaks.

As described above, according to the conventional configuration, in which the size distribution has a single peak, when the transparency in the transparent mode is increased by simply decreasing the spacer density, the opacity in the opaque mode decreases. On the other hand, when the opacity in the opaque mode is increased by simply increasing the spacer density, the transparency in the transparent mode decreases.

In this regard, according to the above light control sheet, large sized spacers enhance the intensity of forward-scattered light due to Mie scattering, compared with small sized spacers. Accordingly, increasing the formulation ratio of the small sized spacers decreases the intensity of forward-scattered light and thus increases opacity in the opaque mode, while suppressing a decrease in transparency in the transparent mode. Further, increasing the formulation ratio of the large sized spacers increases the intensity of forward-scattered light due to Mie scattering and thus increases transparency in the transparent mode, while suppressing a decrease in opacity in the opaque mode. As a result, it is possible to expand the degree of design freedom to mitigate the correlation between two opposite physical properties.

A light control device includes: the above light control sheet; and a drive circuit that drives the light control sheet. According to the above light control device, it is possible to expand degree of the design freedom to mitigate the correlation between two opposite physical properties.

Obviously, numerous modifications and variations of the present invention are possible in light of the above teachings. It is therefore to be understood that within the scope of the appended claims, the invention may be practiced otherwise than as specifically described herein.

What is claimed is:

1. A light control sheet, comprising:
a first transparent electrode;
a second transparent electrode; and
a liquid crystal layer formed between the first transparent electrode and the second transparent electrode and comprising a liquid crystal composition and a plurality of spacers dispersed in the liquid crystal layer such that the plurality of spacers includes a plurality of first spacers having a length substantially equal to a thickness of the liquid crystal layer and a plurality of second spacers having a length smaller than the thickness of the liquid crystal layer and that the first and second spacers are dispersed in the liquid crystal layer,
wherein the liquid crystal layer has a uniform thickness and is formed such that the spacers have an average size in a range of 3 μm to 50 μm and a plurality of discrete peaks in a size distribution and that the plurality of discrete peaks includes a first peak derived from the plurality of first spacers and having a mode of size in a range of 8 μm to 50 μm in the size distribution and a second peak derived from the plurality of second spacers and having a mode of size in a range of 3 μm to 7 μm in the size distribution.

2. The light control sheet according to claim 1, wherein the discrete peaks include the first peak whose mode is largest among the discrete peaks.

3. The light control sheet according to claim 2, wherein the discrete peaks include the second peak whose mode is second largest among the discrete peaks.

4. The light control sheet according to claim 3, wherein the first peak corresponds to 30% to 90% of the spacers, and the second peak corresponds to a remaining part of the spacers.

5. The light control sheet according to claim 3, wherein the plurality of spacers in the liquid crystal layer has the first peak having a number of spacers that is larger than a number of spacers in the second peak.

6. The light control sheet according to claim 4, wherein the plurality of spacers in the liquid crystal layer has the first peak having a number of spacers that is larger than a number of spacers in the second peak.

7. The light control sheet according to claim 1, wherein the liquid crystal layer includes the spacers at a density in a range of 30/mm$^2$ to 500/mm$^2$ per unit area.

8. The light control sheet according to claim 3, wherein the liquid crystal layer includes the spacers at a density in a range of 30/mm$^2$ to 500/mm$^2$ per unit area.

9. The light control sheet according to claim 6, wherein the liquid crystal layer includes the spacers at a density in a range of 30/mm$^2$ to 500/mm$^2$ per unit area.

10. The light control sheet according to claim 1, further comprising:
a contact layer positioned in contact with the liquid crystal layer,
wherein the spacers include at least one of a granular spacer and a protruding spacer protruding from the contact layer toward the liquid crystal layer.

11. The light control sheet according to claim 1, further comprising:
a contact layer positioned in contact with the liquid crystal layer,
wherein the spacers include a granular spacer and a protruding spacer protruding from the contact layer toward the liquid crystal layer.

12. The light control sheet according to claim 3, further comprising:
a contact layer positioned in contact with the liquid crystal layer,
wherein the spacers include a granular spacer and a protruding spacer protruding from the contact layer toward the liquid crystal layer.

13. The light control sheet according to claim 6, further comprising:
a contact layer positioned in contact with the liquid crystal layer,
wherein the spacers include a granular spacer and a protruding spacer protruding from the contact layer toward the liquid crystal layer.

14. A light control device, comprising:
the light control sheet of claim 1; and
a drive circuit configured to drive the light control sheet.

15. A light control device, comprising:
the light control sheet of claim 3; and
a drive circuit configured to drive the light control sheet.

16. A light control device, comprising:
   the light control sheet of claim 6; and
   a drive circuit configured to drive the light control sheet.

17. The light control sheet according to claim 1, wherein the liquid crystal layer is formed such that the plurality of spacers has a coefficient of variation in the range of 3% to 5% for spacers in the first peak and a coefficient of variation in the range of 3% to 5% for spacers in the second peak.

18. The light control sheet according to claim 1, wherein the first peak corresponds to 30% to 90% of the spacers, and the second peak corresponds to a remaining part of the spacers.

19. The light control sheet according to claim 1, wherein the first peak corresponds to 30% to 70% of the spacers, and the second peak corresponds to a remaining part of the spacers.

20. The light control sheet according to claim 19, wherein the plurality of spacers in the liquid crystal layer has the first peak having a number of spacers that is larger than a number of spacers in the second peak.

* * * * *